US012039938B2

(12) United States Patent
Byun et al.

(10) Patent No.: US 12,039,938 B2
(45) Date of Patent: Jul. 16, 2024

(54) OVER-DRIVING METHOD AND APPARATUS, DISPLAY DEVICE, ELECTRONIC DEVICE, AND STORAGE MEDIUM

(71) Applicant: Beijing ESWIN Computing Technology Co., Ltd., Beijing (CN)

(72) Inventors: Seung Chan Byun, Beijing (CN); Hyung Lae Kim, Beijing (CN); Tae Jin Kim, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 18/090,677

(22) Filed: Dec. 29, 2022

(65) Prior Publication Data

US 2023/0237967 A1 Jul. 27, 2023

(30) Foreign Application Priority Data

Jan. 27, 2022 (CN) ......................... 202210101286.7

(51) Int. Cl.
*G09G 5/10* (2006.01)
*G09G 3/3291* (2016.01)

(52) U.S. Cl.
CPC ... *G09G 3/3291* (2013.01); *G09G 2320/0233* (2013.01); *G09G 2320/0252* (2013.01);
(Continued)

(58) Field of Classification Search
CPC .. G09G 3/20; G09G 3/32; G09G 3/36; G09G 3/3266; G09G 3/3258; G09G 3/3291; G09G 3/3283; G09G 3/325; G09G 3/3225; G09G 3/3233; G09G 2320/0233; G09G 2320/0252; G09G 2320/0285; G09G 2340/16; G09G 2360/12; G09G 5/02; G09G 5/10; H01L 27/32; H04N 9/68; H04N 9/73; H04N 5/21; H04N 5/225; H04N 5/235; H04N 5/232; H04N 13/00; H04N 13/04; H04N 25/53; H04N 25/677; H04N 25/706; H04N 25/766; G06T 7/00; G06T 7/01; G06T 7/40; G06T 7/73
See application file for complete search history.

(56) References Cited

U.S. PATENT DOCUMENTS

2020/0143750 A1* 5/2020 Gao ..................... H10K 59/121
2023/0154436 A1* 5/2023 Lee .......................... G09G 5/10
345/690

* cited by examiner

*Primary Examiner* — Chanh D Nguyen
*Assistant Examiner* — Nguyen H Truong
(74) *Attorney, Agent, or Firm* — Scully, Scott, Murphy & Presser, P.C.

(57) ABSTRACT

An over-driving method and apparatus for a display device, a display device, an electronic device, and a storage medium are provided. The display device includes a plurality of pixels, and the plurality of pixels are arranged in a plurality of rows and a plurality of columns as an array. The method includes: obtaining an initial compensation parameter according to a first average brightness level and a second average brightness level of a row of pixels; obtaining a first gain coefficient according to a value of a target pixel in the current frame and the second average brightness level corresponding to the row in which the target pixel is located, the target pixel being one pixel in the row of pixels; and obtaining a target compensation parameter of the target pixel according to the initial compensation parameter and the first gain coefficient.

20 Claims, 11 Drawing Sheets

(52) U.S. Cl.
CPC . *G09G 2320/0285* (2013.01); *G09G 2340/16* (2013.01); *G09G 2360/12* (2013.01)

| Previous frame | Current frame | Third gain coefficient |
|---|---|---|
| Simple line | Simple line | G1 |
| Simple line | Complex line | G2 |
| Complex line | Simple line | G3 |
| Complex line | Complex line | G4 |

OVER-DRIVING METHOD AND APPARATUS, DISPLAY DEVICE, ELECTRONIC DEVICE, AND STORAGE MEDIUM

CROSS-REFERENCE

The application claims priority to Chinese patent application No. 202210101286.7, filed on Jan. 27, 2022. For all purposes under the U.S. law, the entire disclosure of the aforementioned application is incorporated by reference as part of the disclosure of this application.

TECHNICAL FIELD

Embodiments of the present disclosure relate to an over-driving method and apparatus for a display device, a display device, an electronic device, and a storage medium.

BACKGROUND

In the field of display technology, when an image of a display screen scrolls up and down, a purple line phenomenon may be found in a specific pattern. Red/green/blue (R/G/B) pixels have different parasitic capacitance due to pixel circuit design and material characteristics. In addition, R/G/B pixels also have different light emission threshold voltages and different driving currents. These differences make response rates of the R/G/B pixels different. Different response time causes specific colors to appear instantaneously, which, for example, is referred to as a purple line phenomenon; and such phenomenon is more obvious in low brightness, leading to a decline in display quality. Therefore, an over-drive technology is usually used to improve display quality, so as to alleviate or avoid the purple line phenomenon.

SUMMARY

At least one embodiment of the present disclosure provides an over-driving method for a display device. The display device comprises a plurality of pixels, the plurality of pixels are arranged in a plurality of rows and a plurality of columns as an array. The method comprises: obtaining an initial compensation parameter according to a first average brightness level and a second average brightness level of a row of pixels, where the first average brightness level is an average brightness level of the row of pixels in a current frame, and the second average brightness level is an average brightness level of the row of pixels in a previous frame; obtaining a first gain coefficient according to a value of a target pixel in the current frame and the second average brightness level corresponding to the row in which the target pixel is located, where the target pixel is one pixel in the row of pixels; and obtaining a target compensation parameter of the target pixel according to the initial compensation parameter and the first gain coefficient.

For example, in the method provided by an embodiment of the present disclosure, obtaining the first gain coefficient according to the value of the target pixel in the current frame and the second average brightness level corresponding to the row in which the target pixel is located comprises: calculating an absolute value of a difference between the value of the target pixel in the current frame and the second average brightness level corresponding to the row in which the target pixel is located; and determining the first gain coefficient according to the absolute value of the difference.

For example, in the method provided by an embodiment of the present disclosure, determining the first gain coefficient according to the absolute value of the difference comprises: taking the absolute value of the difference as an input of a preset function, and taking an output of the preset function as the first gain coefficient. The input and the output of the preset function are positively correlated.

For example, in the method provided by an embodiment of the present disclosure, in the case where the absolute value of the difference is 0, the first gain coefficient is 0; and a value range of the first gain coefficient is from 0 to 1.

For example, the method provided by an embodiment of the present disclosure further comprises: obtaining a second gain coefficient according to the value of the target pixel in the current frame and a value of an adjacent pixel in the current frame. The adjacent pixel is a pixel located in a same column as the target pixel among pixels in a previous row of the row in which the target pixel is located.

For example, in the method provided by an embodiment of the present disclosure, obtaining the second gain coefficient according to the value of the target pixel in the current frame and the value of the adjacent pixel in the current frame comprises: in response to an absolute value of a difference between the value of the target pixel in the current frame and the value of the adjacent pixel in the current frame being greater than a preset threshold, determining the second gain coefficient to be 0; and in response to the absolute value of the difference between the value of the target pixel in the current frame and the value of the adjacent pixel in the current frame being less than or equal to the preset threshold, determining the second gain coefficient to be 1.

For example, the method provided by an embodiment of the present disclosure further comprises: obtaining a third gain coefficient according to an image complexity parameter of the row in which the target pixel is located in the current frame and an image complexity parameter of the row in which the target pixel is located in the previous frame.

For example, in the method provided by an embodiment of the present disclosure, the image complexity parameter is obtained according to image edge information.

For example, in the method provided by an embodiment of the present disclosure, the image edge information comprises an absolute value of a difference between values of each two adjacent pixels among the pixels of the row in which the target pixel is located; and the image complexity parameter comprises a sum by adding up every absolute value of the difference between the values of each two adjacent pixels among the pixels of the row in which the target pixel is located.

For example, in the method provided by an embodiment of the present disclosure, obtaining the third gain coefficient according to the image complexity parameter of the row in which the target pixel is located in the current frame and the image complexity parameter of the row in which the target pixel is located in the previous frame comprises: determining complexity of the row in which the target pixel is located in the current frame according to the image complexity parameter of the row in which the target pixel is located in the current frame; determining complexity of the row in which the target pixel is located in the previous frame according to the image complexity parameter of the row in which the target pixel is located in the previous frame; and determining the third gain coefficient according to the complexity of the row in which the target pixel is located in the current frame and the complexity of the row in which the target pixel is located in the previous frame.

For example, in the method provided by an embodiment of the present disclosure, the complexity is divided into two categories of complication and simplicity; in the case where the image complexity parameter is greater than a preset reference value, the complexity is complication; and in the case where the image complexity parameter is less than or equal to the preset reference value, the complexity is simplicity.

For example, in the method provided by an embodiment of the present disclosure, obtaining the third gain coefficient according to the complexity of the row in which the target pixel is located in the current frame and the complexity of the row in which the target pixel is located in the previous frame comprises: determining the third gain coefficient to be 1, in response to the complexity of the row in which the target pixel is located in the current frame being identical to the complexity of the row in which the target pixel is located in the previous frame; and determining the third gain coefficient to be a coefficient less than 1, in response to the complexity of the row in which the target pixel is located in the current frame being different from the complexity of the row in which the target pixel is located in the previous frame.

For example, in the method provided by an embodiment of the present disclosure, determining the third gain coefficient to be the coefficient less than 1, in response to the complexity of the row in which the target pixel is located in the current frame being different from the complexity of the row in which the target pixel is located in the previous frame, comprises: determining the third gain coefficient to be K1, in response to the complexity of the row in which the target pixel is located in the current frame being complication and the complexity of the row in which the target pixel is located in the previous frame being simplicity; and determining the third gain coefficient to be K2, in response to the complexity of the row in which the target pixel is located in the current frame being simplicity and the complexity of the row in which the target pixel is located in the previous frame being complication, where $0 \leq K1 < 1$, $0 \leq K2 < 1$, and K1 and K2 are not identical.

For example, in the method provided by an embodiment of the present disclosure, obtaining the target compensation parameter of the target pixel according to the initial compensation parameter and the first gain coefficient comprises: multiplying the initial compensation parameter, the first gain coefficient, the second gain coefficient, and the third gain coefficient, so as to obtain the target compensation parameter.

For example, in the method provided by an embodiment of the present disclosure, obtaining the initial compensation parameter according to the first average brightness level and the second average brightness level of the row of pixels comprises: performing lookup operation with a lookup table according to the first average brightness level and the second average brightness level, obtaining a table lookup result according to an interpolating method, and taking the table lookup result as the initial compensation parameter.

For example, in the method provided by an embodiment of the present disclosure, the average brightness level comprises an average of values of respective pixels in the row of pixels, a value of each pixel comprises a theoretical data voltage of each pixel, and the value of the target pixel comprises the theoretical data voltage of the target pixel; a sum of the target compensation parameter and the value of the target pixel serves as an actual data voltage supplied to the target pixel; and the display device comprises an organic light emitting diode display device.

At least one embodiment of the present disclosure further provides an over-driving apparatus for a display device. The display device comprises a plurality of pixels, the plurality of pixels are arranged in a plurality of rows and a plurality of columns as an array. The over-driving apparatus comprises: an initial comparing circuit, configured to obtain an initial compensation parameter according to a first average brightness level and a second average brightness level of a row of pixels, where the first average brightness level is an average brightness level of the row of pixels in a current frame, and the second average brightness level is an average brightness level of the row of pixels in a previous frame; a first gaining circuit, configured to obtain a first gain coefficient according to a value of a target pixel in the current frame and the second average brightness level corresponding to the row in which the target pixel is located, where the target pixel is one pixel in the row of pixels; and a compensating circuit, configured to obtain a target compensation parameter of the target pixel according to the initial compensation parameter and the first gain coefficient.

At least one embodiment of the present disclosure further provides a display device, which comprises the over-driving apparatus provided by any embodiment of the present disclosure.

At least one embodiment of the present disclosure further provides an electronic device, which comprises: a processor; and a memory, comprising one or more computer program modules. The one or more computer program modules are stored in the memory and configured to be executed by the processor, and the one or more computer program modules are configured to implement the over-driving method for the display device provided by any embodiment of the present disclosure.

At least one embodiment of the present disclosure further provides a storage medium, which stores non-transitory computer readable instructions. The non-transitory computer readable instructions, when executed by a computer, implement the over-driving method for the display device provided by any embodiment of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms “first,” “second,” etc., which are used in the description and the claims of the present application for disclosure, are not intended to indicate any sequence, amount or importance, but distinguish various components. Also, the terms such as “a,” “an,” etc., are not intended to limit the amount, but indicate the existence of at least one. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect”, “connected”, “coupled”, etc., are not intended to define a physical connection or mechanical connection, but may include an electrical connection, directly or indirectly. “On,” “under,” “right,” “left” and the like are only used to indicate relative position relationship, and when the position of the object which is described is changed, the relative position relationship may be changed accordingly.

Figure 1:
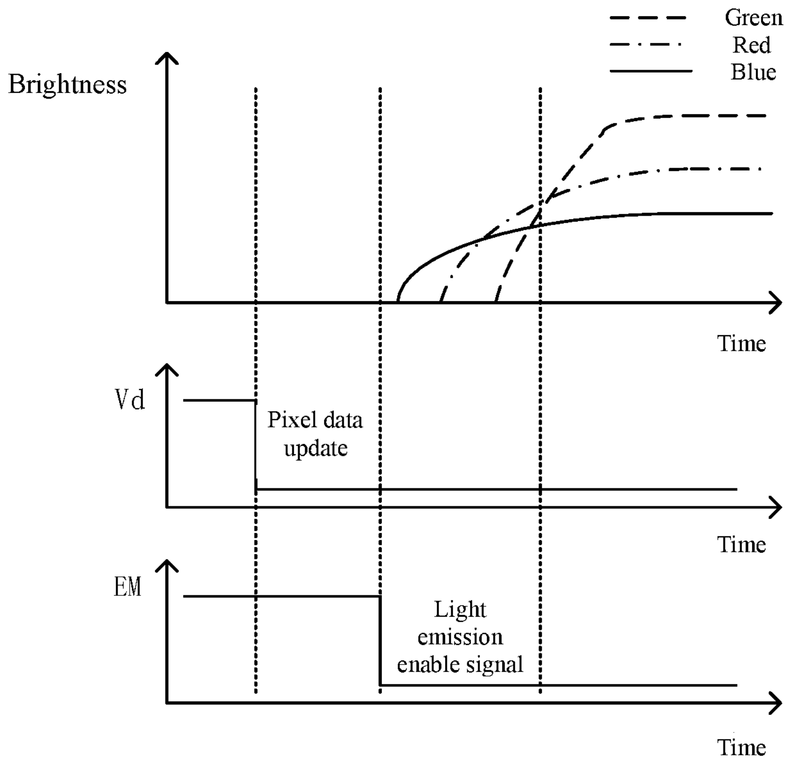
FIG. 1 illustrates a schematic diagram of response time of pixels of different colors.
Figure 2:
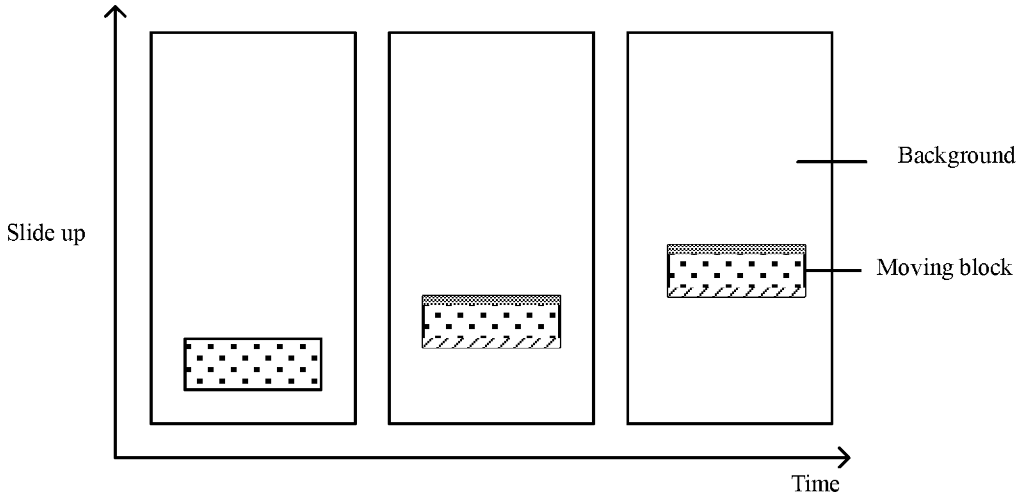
FIG. 2 illustrates a schematic diagram of displaying when a displayed image is slid up.

In an organic light emitting diode (OLED) display device, different R/G/B pixels usually have different response time. As illustrated in FIG. 1, when driving the display device to display, after pixel data Vd is updated, a light emission enable signal EM becomes a valid value, so that OLEDs in the pixels emit light. Pixels with different colors have different response time, so that pixels with different colors have different brightness change curves, which leads to instant appearance of a specific color. For example, as illustrated in FIG. 2, a displayed image is, for example, a box graph; when the displayed image is slid up, the box graph moves up in the screen as a moving block, and then a specific color appears on an upper edge and a lower edge of the moving block, thereby affecting display quality.

In order to alleviate the problem caused by response time, over-driving compensation (ODC) is required, that is, pixels are compensated by using an over-driving technology, so as to improve display quality. However, usual over-driving compensation requires use of a frame memory, an amount of compensation is determined by comparing image data of a current frame with image data of a previous frame. The frame memory may also be referred to as a frame buffer, which requires a large amount of resources (e.g., hardware resources) to be configured. Due to factors of power consumption and a gate size, the frame memory has limited application scenarios, and is hard to be applied to a lightweight device or a mobile terminal.

At least one embodiment of the present disclosure provides an over-driving method and an apparatus used in a display device, a display device, an electronic device, and a storage medium. The over-driving method can implement over-drive of the display device so as to improve a response speed without any frame memory, has low requirements for hardware resources, can reduce hardware costs, and can avoid side effects of over-drive, and effectively improve display quality.

Hereinafter, the embodiments of the present disclosure will be described in detail with reference to the accompanying drawings. It should be noted that same reference signs in different diagrams will be used to denote same elements described.

At least one embodiment of the present disclosure provides an over-driving method used in a display device. The display device includes a plurality of pixels, and the plurality of pixels are arranged in a plurality of rows and a plurality of columns as an array. The method includes: obtaining an initial compensation parameter according to a first average brightness level and a second average brightness level of a row of pixels, where the first average brightness level is an average brightness level of the row of pixels in a current frame, and the second average brightness level is an average brightness level of the row of pixels in a previous frame; obtaining a first gain coefficient according to a value of a target pixel in the current frame and the second average brightness level corresponding to the row in which the target pixel is located, where the target pixel is one pixel in the row of pixels; and obtaining a target compensation parameter of the target pixel according to the initial compensation parameter and the first gain coefficient.

Figure 3:
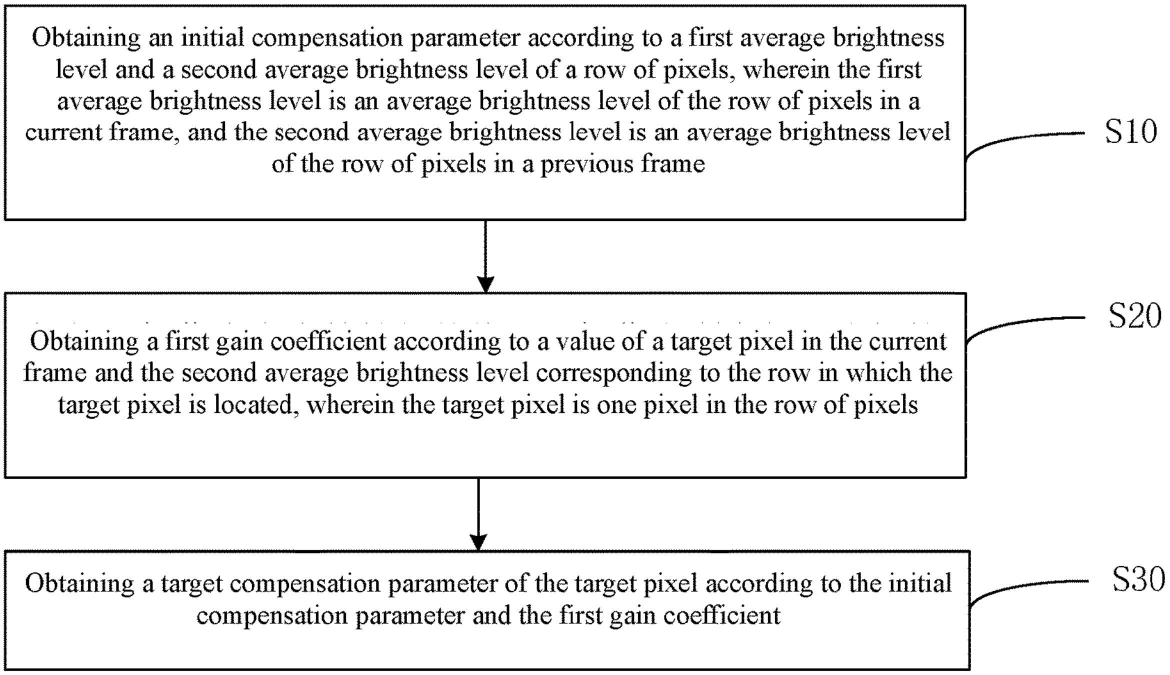
FIG. 3 is a schematic flow chart of an over-driving method for a display device provided by some embodiments of the present disclosure.

FIG. 3 is a schematic flow chart of an over-driving method used in a display device provided by some embodiments of the present disclosure. As illustrated in FIG. 3, in some embodiments, the method includes operations below.

Step S10: obtaining an initial compensation parameter according to a first average brightness level and a second average brightness level of a row of pixels, where the first average brightness level is an average brightness level of the row of pixels in a current frame, and the second average brightness level is an average brightness level of the row of pixels in a previous frame;

Step S20: obtaining a first gain coefficient according to a value of a target pixel in the current frame and the second average brightness level corresponding to the row in which the target pixel is located, where the target pixel is one pixel in the row of pixels;

Step S30: obtaining a target compensation parameter of the target pixel according to the initial compensation parameter and the first gain coefficient.

For example, the over-driving method is used in a display device and can implement over-drive. The display device may be an OLED display device, or may also be a liquid crystal display (LCD) device, a quantum dot light emitting diode (QLED) display device, or other type of display device, which is not limited in the embodiments of the present disclosure. For example, the display device includes a plurality of pixels; and the plurality of pixels are arranged in a plurality of rows and a plurality of columns as an array. The conventional design may be referred to for description of the display device, and no details will be repeated here.

For example, in step S10, the first average brightness level refers to an average brightness level of a certain row of pixels in a current frame, and the second average brightness level refers to an average brightness level of the row of pixels in a previous frame. For example, the average brightness level refers to an average pixel level of a row of pixels, which may also be referred to as a line APL, that is, an average of respective pixel values in a row of pixels. Here, the pixel value refers to a value of a pixel, that is, a gray level voltage, or a data voltage, or pixel data as commonly known, as long as display brightness of the pixel can be reflected. The specific type of the pixel value is not limited in the embodiments of the present disclosure. For example, in some examples, the value of each pixel includes a theoretical data voltage of each pixel; but the theoretical data voltage is not a data voltage finally supplied to the pixel, and an actual data voltage finally supplied to the pixel may be determined only after subsequent processing and calculation. For example, values of all pixels in a row of pixels may be added up, and a sum obtained is divided by the number of pixels in the row, so as to obtain the average brightness level. If the value of the pixel used is the value of the current frame, then the first average brightness level is obtained. If the value of the pixel used is the value of the previous frame, then the second average brightness level is obtained.

Figure 4:
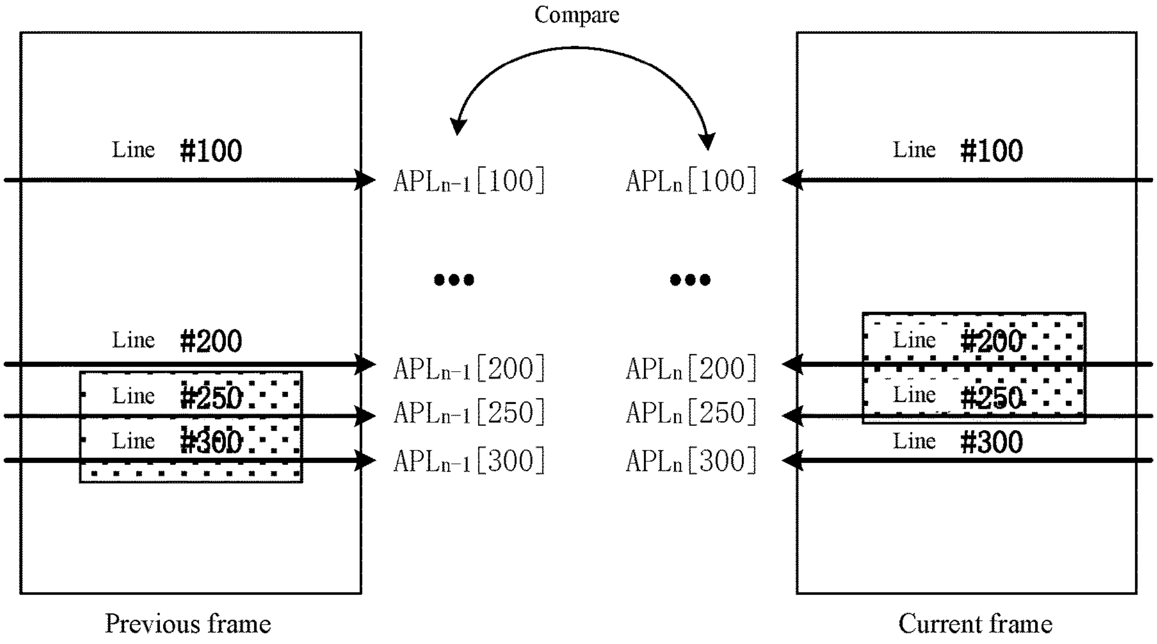
FIG. 4 is a schematic diagram of comparison between a first average brightness level and a second average brightness level in an over-driving method provided by some embodiments of the present disclosure.

For example, in step S10, with respect to a certain pixel, it is needed to compare a first average brightness level and a second average brightness level of the row in which the pixel is located, so as to obtain an initial compensation parameter. For example, as illustrated in FIG. 4, in some examples, with respect to a certain pixel in line 250 (i.e., row 250), it is needed to compare a first average brightness level and a second average brightness level in line 250 in which the pixel is located, that is, it is needed to compare an average brightness level $APL_n$[250] of line 250 in a current frame and an average brightness level $APL_{n-1}$[250] of a previous frame, so as to obtain an initial compensation parameter. For example, in other examples, with respect to a certain pixel in line 300 (i.e., row 300), it is needed to compare a first average brightness level and a second average brightness level of line 300 in which the pixel is located, that is, it is needed to compare an average brightness level $APL_n$[300] in a current frame and an average brightness level $APL_{n-1}$[300] in a previous frame in line 300, so as to obtain an initial compensation parameter. It should be noted that the average brightness level of the current frame and the average brightness level of the previous frame need to be compared in a same row position, that is, it is needed to perform comparison on pixels in a same row.

Figure 5:
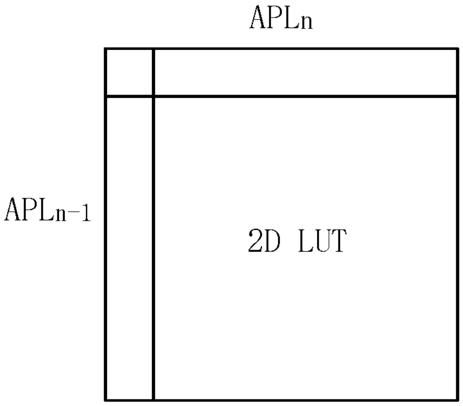
FIG. 5 is a schematic diagram of a lookup table used in an over-driving method provided by some embodiments of the present disclosure.

For example, step S10 may further include: performing lookup operation with a lookup table according to the first average brightness level and the second average brightness level, obtaining a table lookup result according to an interpolating method, and taking the table lookup result as the initial compensation parameter. For example, as illustrated in FIG. 5, a two-dimensional lookup table (2D LUT) may be adopted; and the lookup table reflects a mapping relationship between the first average brightness level (e.g., the average brightness level $APL_n$ of the current frame), the second average brightness level (e.g., the average brightness level $APL_{n-1}$ of the previous frame), and an initial compensation value. By looking up the table and combining the interpolating method, with respect to any first average brightness level and second average brightness level, a table lookup result can be obtained, that is, a determined initial compensation value can be obtained, and the initial compensation value is taken as the initial compensation parameter. For example, if there is no difference between $APL_n$ and $APL_{n-1}$ compared, that is, the two are identical, then the initial compensation parameter obtained by looking up the table is 0; and if $APL_n$ and $APL_{n-1}$ compared are different from each other, then the initial compensation parameter obtained by looking up the table is a value other than 0. The conventional design may be referred to for detailed description of $APL_n$, $APL_{n-1}$ and the lookup table, and no details will be repeated here.

Figure 6:
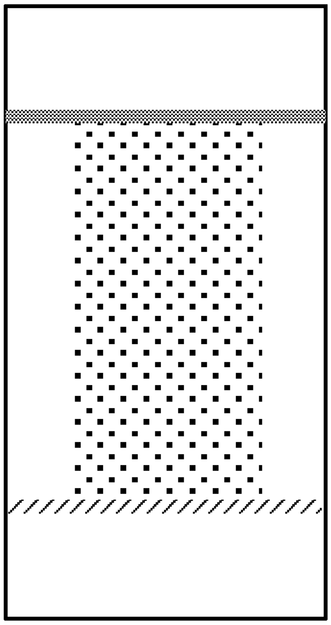
FIG. 6 is a schematic diagram of a side effect of processing based on a pixel row.

When performing over-drive, if the first average brightness level and the second average brightness level are compared only using the mode of step S10, side effects illustrated in FIG. 6 may occur, that is, over-driving compensation is performed on pixels which do not need over-driving compensation, so that lines and color errors appear in the image. Therefore, it is needed to execute step S20 to eliminate the side effects of over-drive.

Figure 7:
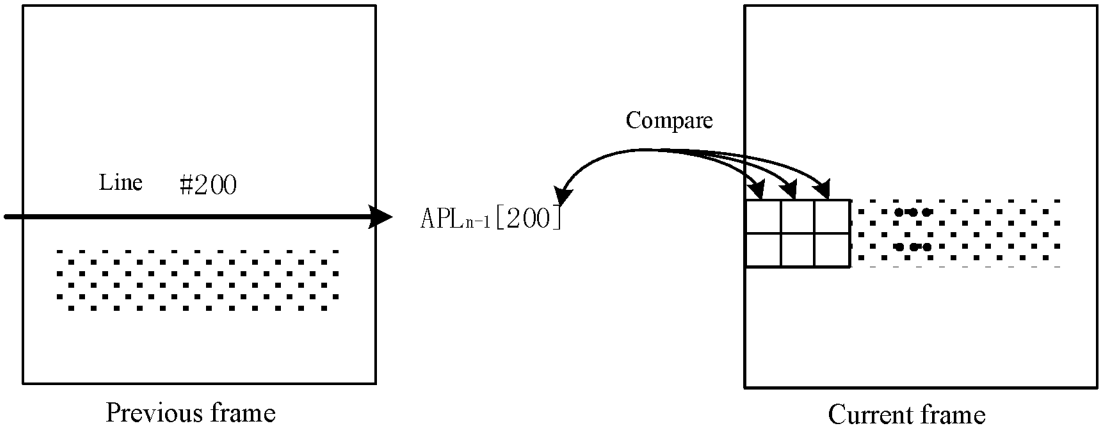
FIG. 7 is a schematic diagram of comparison of a pixel with an average brightness level of a previous frame in an over-driving method provided by some embodiments of the present disclosure.

For example, in step S20, the target pixel refers to a certain pixel in a row of pixels, that is, a pixel that needs over-driving compensation by using the over-driving method according to the embodiment of the present disclosure. For example, the value of the target pixel in the current frame may be compared with the second average brightness level corresponding to the row in which the target pixel is located, so as to obtain the first gain coefficient; and the first gain coefficient is used for adjusting and correcting the initial compensation parameter. The value of the target pixel in the current frame refers to, for example, a gray level voltage or a data voltage or pixel data of the target pixel in the current frame. For example, the value of the target pixel includes a theoretical data voltage of the target pixel; the theoretical data voltage is not a data voltage that is finally supplied to the target pixel; an actual data voltage that is finally supplied to the target pixel may be determined only after subsequent processing and calculation. The second average brightness level corresponding to the row in which the target pixel is located is the average brightness level of the row of pixels in the previous frame, that is, the foregoing $APL_{n-1}$. For example, in some examples, as illustrated in FIG. 7, with respect to a certain pixel located in line 200, a value of the pixel in the current frame is compared with an average brightness level $APL_{n-1}$ [200] of pixels in line 200 in the previous frame, so as to determine the first gain coefficient.

Figure 8:
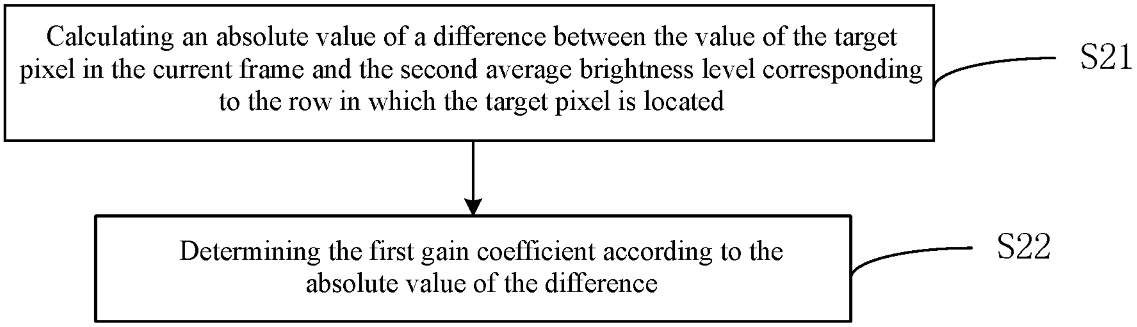
FIG. 8 is a schematic flow chart of step S20 in FIG. 3.

FIG. 8 is a schematic flow chart of step S20 in FIG. 3. For example, in some examples, as illustrated in FIG. 8, the above-described step S20 may further include operations below.

Step S21: calculating an absolute value of a difference between the value of the target pixel in the current frame and the second average brightness level corresponding to the row in which the target pixel is located;

Step S22: determining the first gain coefficient according to the absolute value of the difference.

For example, in step S21, firstly, the difference between the value of the target pixel in the current frame and the second average brightness level (i.e., the average brightness level in the previous frame) corresponding to the row in which the target pixel is located is calculated, and then the absolute value of the difference is obtained. The absolute value of the difference reflects the difference degree between the value of the target pixel in the current frame and the average brightness level of the row of pixels in the previous frame.

For example, in step S22, the first gain coefficient is determined according to the absolute value of the difference. For example, the absolute value of the difference may be taken as an input of a preset function, and an output of the preset function may be taken as the first gain coefficient. For example, the input and the output of the preset function are positively correlated. The greater the absolute value of the difference, the greater the difference between the value of the target pixel in the current frame and the average brightness level of the row of pixels in the previous frame, and the greater the first gain coefficient; the smaller the absolute value of the difference, the smaller the difference between the value of the target pixel in the current frame and the average brightness level of the row of pixels in the previous frame, and the smaller the first gain coefficient. It should be noted that the preset function may be a non-linear function, or a linear function; the mapping relationship between the input of the preset function and the output of the preset function may be determined according to actual needs, which is not limited in the embodiments of the present disclosure.

For example, when the absolute value of the difference is 0, it indicates that the value of the target pixel in the current frame is identical to the average brightness level of the row of pixels in the previous frame; and at this time, the first gain coefficient is 0, so that no over-driving compensation is performed on the pixel, thereby avoiding the side effect of over-driving compensation. The method for obtaining the over-driving compensation value by using the first gain coefficient is described later, and no details will be repeated here. For example, the value range of the first gain coefficient is from 0 to 1.

Figure 9:
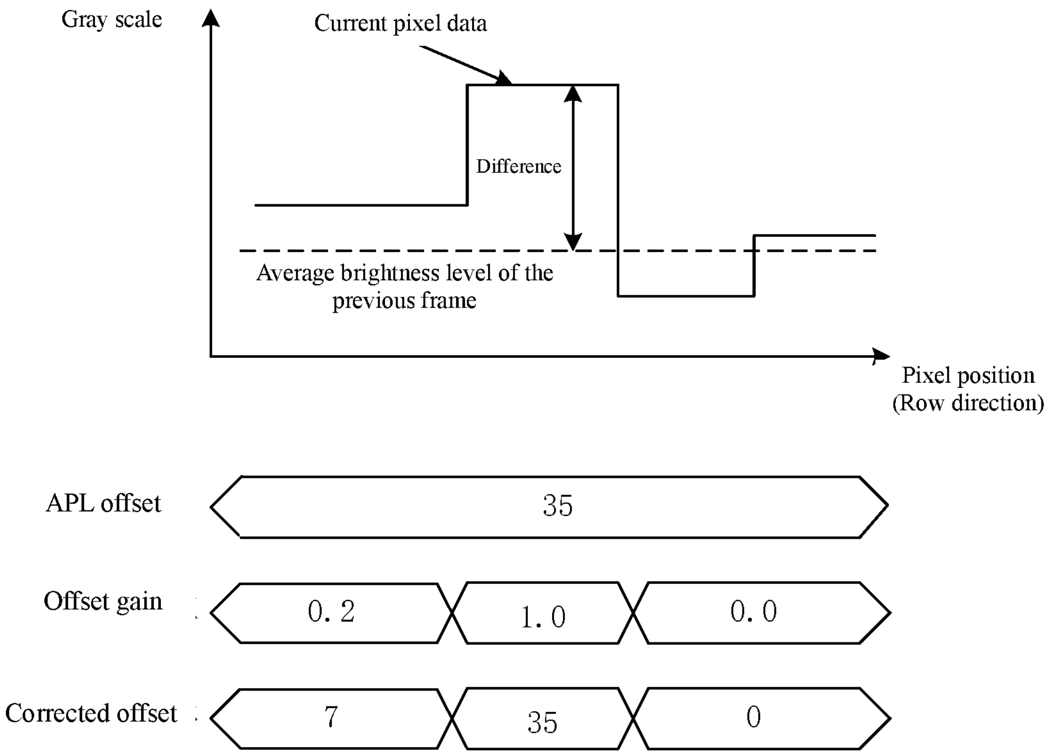
FIG. 9 is a schematic diagram I of determining a first gain coefficient in an over-driving method provided in some embodiments of the present disclosure.

FIG. 9 is a schematic diagram I of determining a first gain coefficient in an over-driving method provided in some embodiments of the present disclosure. As illustrated in FIG. 9, in some examples, with respect to three pixels located in a same row (e.g., a first pixel, a second pixel, and a third pixel along a row direction from left to right), a value of each pixel in a current frame (i.e., current pixel data) is respectively compared with an average brightness level of the row in a previous frame, a difference is calculated, and an absolute value of the difference is obtained. For example, if an absolute value of a difference corresponding to the second pixel is the greatest, a first gain coefficient (i.e., an offset gain illustrated in the diagram) is determined to be 1.0; if an absolute value of a difference corresponding to the third pixel is the least, the first gain coefficient is determined to be 0.0; if an absolute value of a difference corresponding to the first pixel is moderate, the first gain coefficient is determined to be 0.2.

For example, in some examples, after the first gain coefficient is obtained, a product of the first gain coefficient and the initial compensation parameter may be taken as a target compensation parameter. In the example illustrated in FIG. 9, supposing that the initial compensation parameter (i.e., an APL offset illustrated in the diagram) of the row of pixels obtained by looking up the table is 35, then a target compensation parameter (i.e., a corrected offset illustrated in the diagram) of the first pixel is 35*0.2=7, a target compensation parameter of the second pixel is 35*1.0=35, and a target compensation parameter of the third pixel is 35*0.0=0. With respect to a certain pixel, a target compensation parameter and a pixel value is summed up to obtain actual data (e.g., an actual data voltage) that should be supplied to the pixel, so as to implement over-driving compensation. For example, the difference between the value of the second pixel in the current frame and the average brightness level of the row in the previous frame is greater, and the first gain coefficient thereof is 1.0, so the offset value output by the lookup table may be adjusted by 1 time. For example, the difference between the value of the first pixel in the current frame and the average brightness level of the row in the previous frame is less, and the first gain coefficient thereof is 0.2, so the offset value output by the lookup table may be adjusted by 0.2 times, so as to reduce the compensation value. For example, the difference between the value of the third pixel in the current frame and the average brightness level of the row in the previous frame is the least, and the first gain coefficient thereof is 0.0, so the offset value output by the lookup table may be adjusted by 0 times, that is, no compensation value is supplied, and no over-driving compensation is performed on the third pixel.

Figure 10:
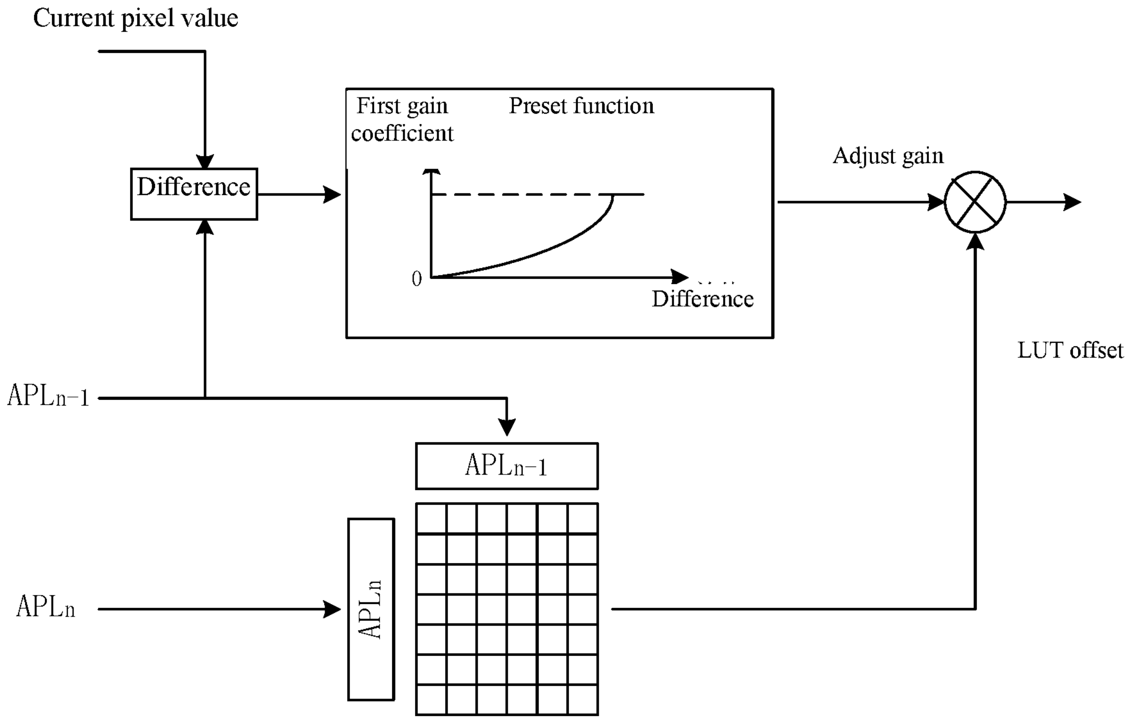
FIG. 10 is a schematic diagram II of determining a first gain coefficient in an over-driving method provided by some embodiments of the present disclosure.

FIG. 10 is a schematic diagram II of determining a first gain coefficient in an over-driving method provided by some embodiments of the present disclosure; and meanwhile, FIG. 10 also illustrates a process of taking the product of the first gain coefficient and the initial compensation parameter as the target compensation parameter.

As illustrated in FIG. 10, in some examples, firstly, $APL_n$ and $APL_{n-1}$ are used for table lookup, so as to obtain the initial compensation parameter (i.e., an LUT offset illustrated in the diagram). Next, an absolute value of a difference between the current pixel value and $APL_{n-1}$ is calculated, and the first gain coefficient (i.e., an adjustment gain illustrated in the diagram) is obtained according to the preset function. A value range of the first gain coefficient is from 0 to 1, and the specific functional relationship of the preset function, for example, may be determined according to experiment or experience. Then, the first gain coefficient is multiplied by the initial compensation parameter, so as to obtain the target compensation parameter.

The over-driving method provided by the embodiments of the present disclosure may implement over-drive of the display device so as to improve the response speed; the respective foregoing steps only involve comparison of line APL, but do not involve comparison of frame data, thus no frame memory is required, which has low requirements for hardware resources and may reduce hardware costs.

Figure 11:
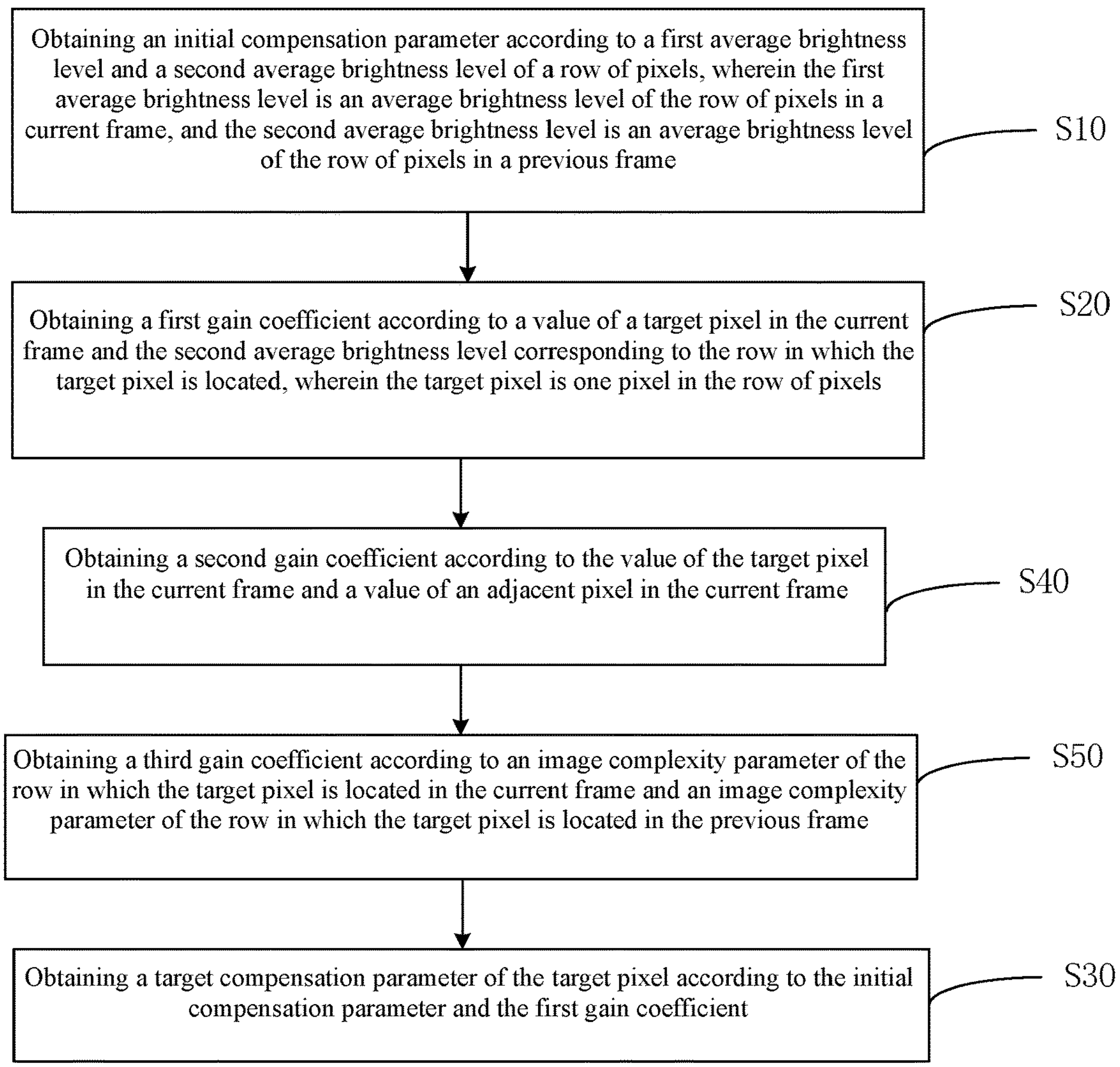
FIG. 11 is a schematic flow chart of another over-driving method for a display device provided by some embodiments of the present disclosure.

FIG. 11 is a schematic flow chart of another over-driving method used in a display device provided by some embodiments of the present disclosure. For example, as illustrated in FIG. 11, in some embodiments, the method may further include steps S40 and S50; in this embodiment, steps S10 to S30 are substantially the same as steps S10 to S30 in the method illustrated in FIG. 3, and no details will be repeated here.

Step S40: obtaining a second gain coefficient according to the value of the target pixel in the current frame and a value of an adjacent pixel in the current frame;

Step S50: obtaining a third gain coefficient according to an image complexity parameter of the row in which the target pixel is located in the current frame and an image complexity parameter of the row in which the target pixel is located in the previous frame.

Figure 12:
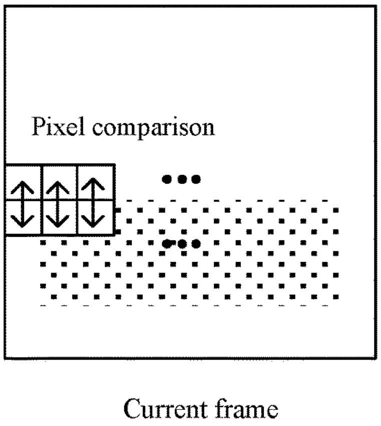
FIG. 12 is a schematic diagram of pixel comparison in an over-driving method provided by some embodiments of the present disclosure.

For example, in step S40, the adjacent pixel refers to a pixel located in a same column as the target pixel among pixels in the previous row of the row in which the target pixel is located, that is, the adjacent pixel is adjacent to the target pixel, and the two are located in a same column. In the current frame, the value of the target pixel is compared with the value of the adjacent pixel, so as to obtain the second gain coefficient. For example, the second gain coefficient is used for adjusting and correcting the initial compensation parameter. As illustrated in FIG. 12, in some examples, with respect to a certain pixel, it is needed to compare the value of the pixel in the current frame with the value of the adjacent pixel in the current frame, so as to determine the second gain coefficient, where the adjacent pixel is a pixel located in a same column as the target pixel among the pixels in the previous row of the row in which the pixel is located.

Figure 13:
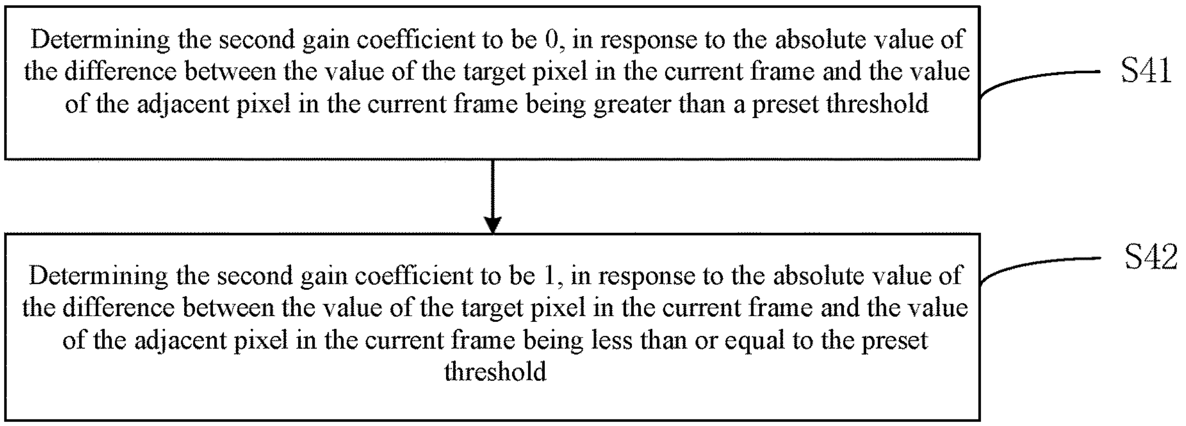
FIG. 13 is a schematic flow chart of step S40 in FIG. 11.

FIG. 13 is a schematic flow chart of step S40 in FIG. 11. As illustrated in FIG. 13, in some examples, step S40 may further include operations below.

Step S41: determining the second gain coefficient to be 0 in response to the absolute value of the difference between the value of the target pixel in the current frame and the value of the adjacent pixel in the current frame being greater than a preset threshold;

Step S42: determining the second gain coefficient to be 1 in response to the absolute value of the difference between the value of the target pixel in the current frame and the value of the adjacent pixel in the current frame being less than or equal to the preset threshold.

For example, in step S41, in the current frame, if the absolute value of the difference between the value of the target pixel and the value of the adjacent pixel is greater than the preset threshold, then the second gain coefficient is determined to be 0. At this time, when the second gain coefficient is multiplied by the initial compensation parameter, the result is 0, which is equivalent to that no compensation value is supplied. That is, if the difference between the value of the target pixel and the value of the adjacent pixel is great, it indicates that the target pixel does not need over-driving compensation, so no over-driving compensation is supplied to the target pixel, which may avoid the side effect of over-driving compensation. For example, the value of the target pixel may refer to a gray level voltage or a data voltage or pixel data, etc. of the target pixel, and the value of the adjacent pixel may refer to a gray level voltage or a data voltage or pixel data, etc. of the adjacent pixel.

For example, a specific value of the preset threshold may be determined according to actual needs, for example, determined according to an empirical value, experimental data, and a desired display effect, which will not be limited in the embodiments of the present disclosure. For example, in some examples, if the value of the pixel is 8 bit, the preset threshold may be a value in a range of 1 to 16.

For example, in step S42, in the current frame, if the absolute value of the difference between the value of the target pixel and the value of the adjacent pixel is less than or equal to the preset threshold, the second gain coefficient is determined to be 1. At this time, when multiplying the second gain coefficient by the initial compensation parameter, the second gain coefficient does not affect the original compensation value. That is, if the difference between the value of the target pixel and the value of the adjacent pixel is less, it indicates that the target pixel needs over-driving compensation, so over-driving compensation is supplied to the target pixel, so as to implement over-drive.

Returning to FIG. 11, in step S50, the third gain coefficient is obtained according to the image complexity parameter of the row in which the target pixel is located in the current frame and the image complexity parameter of the row in which the target pixel is located in the previous frame. For example, by comparing the image complexity parameter of the row in which the target pixel is located in the current frame and the image complexity parameter of the row in which the target pixel is located in the previous frame, the third gain coefficient is determined; and the third gain coefficient is used, for example, for adjusting and correcting the initial compensation parameter.

For example, the image complexity parameter is obtained according to image edge information and is used for representing image complexity degree of the row of pixels. For example, the image edge information may be detected and calculated in a variety of ways. In some examples, the image edge information includes an absolute value of a difference between values of each two adjacent pixels among the pixels of the row in which the target pixel is located, so the image complexity parameter may be a sum by adding up every absolute value of a difference between values of each two adjacent pixels among the pixels of the row in which the target pixel is located.

For example, in some examples, assuming that a row of pixels includes a plurality of pixels, then the image edge information may be expressed as $|pixel(k)-pixel(k-1)|$, here, pixel(k) represents a value of pixel k among the row of pixels, and pixel (k−1) represents a value of pixel (k−1) among the row of pixels. After absolute values of differences between values of every two adjacent pixels in the row of pixels are calculated, these absolute values are added up, and the result obtained thereby is taken as an image complexity parameter of the row of pixels. If the adopted pixel value is the value of the current frame, the result obtained is the image complexity parameter of the row of pixels in the current frame; if the pixel value adopted is the value of the previous frame, the result obtained is the image complexity parameter of the row of pixels in the previous frame. For example, each row of pixels corresponds to an image complexity parameter of the current frame and an image complexity parameter of the previous frame. For example, the image complexity parameters corresponding to each row of pixels are stored in a line memory (or referred to as a line buffer), and the number of bits of the image complexity parameter is determined according to logical resources.

It should be noted that the above-described mode of calculating the image edge information is only exemplary, but not restrictive; and any other applicable mode may be adopted to calculate the image edge information, which may be determined according to actual needs, and will not be limited in the embodiments of the present disclosure. Correspondingly, according to different modes of calculating the image edge information, different modes of representing and calculating the image complexity parameter may also be adopted, as long as image complexity degree of the row of pixels can be reflected, which will not be limited in the embodiments of the present disclosure.

Figure 14:
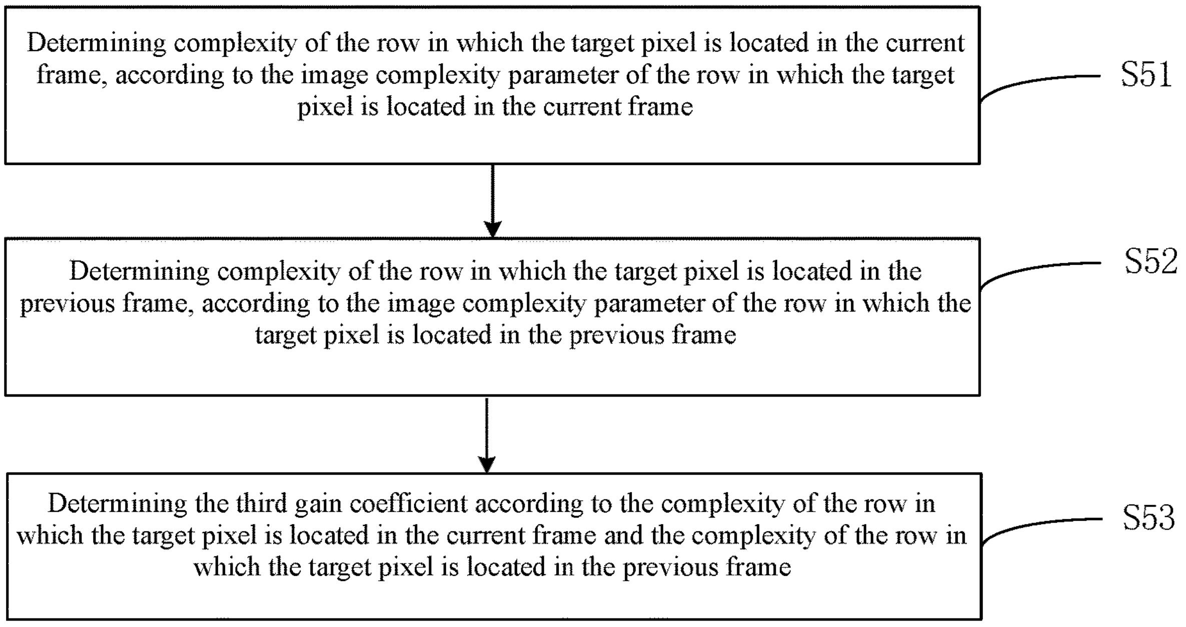
FIG. 14 is a schematic flow chart of step S50 in FIG. 11.

FIG. 14 is a schematic flow chart of step S50 in FIG. 11. As illustrated in FIG. 14, in some examples, step S50 may further include operations below.

Step S51: determining complexity of the row in which the target pixel is located in the current frame, according to the image complexity parameter of the row in which the target pixel is located in the current frame;

Step S52: determining complexity of the row in which the target pixel is located in the previous frame, according to the image complexity parameter of the row in which the target pixel is located in the previous frame;

Step S53: determining the third gain coefficient according to the complexity of the row in which the target pixel is located in the current frame and the complexity of the row in which the target pixel is located in the previous frame.

For example, complexity may be divided into two categories, namely: complication and simplicity. If the image complexity parameter is greater than a preset reference value, the complexity is complication; and if the image complexity parameter is less than or equal to the preset reference value, the complexity is simplicity. For example, the specific value of the preset reference value may be determined according to actual needs, and is not limited in the embodiments of the present disclosure.

For example, in step S51, the complexity of the row in which the target pixel is located in the current frame is determined, according to the image complexity parameter of the row in which the target pixel is located in the current frame. If the image complexity parameter of the row in which the target pixel is located in the current frame is greater than the preset reference value, the complexity of the row of pixels in the current frame is determined as "complication"; and if the image complexity parameter of the row in which the target pixel is located in the current frame is less than or equal to the preset reference value, the complexity of the row of pixels in the current frame is determined to be "simplicity".

For example, in step S52, the complexity of the row in which the target pixel is located in the previous frame is determined, according to the image complexity parameter of the row in which the target pixel is located in the previous frame. If the image complexity parameter of the row in which the target pixel is located in the previous frame is greater than the preset reference value, the complexity of the row of pixels in the previous frame is determined as "complication"; if the image complexity parameter of the row in which the target pixel is located in the previous frame is less than or equal to the preset reference value, the complexity of the row of pixels in the previous frame is determined as "simplicity".

For example, in step S53, the third gain coefficient may be determined according to the complexity of the row in which the target pixel is located in the current frame and the complexity of the row in which the target pixel is located in the previous frame.

Figures 15, 16:
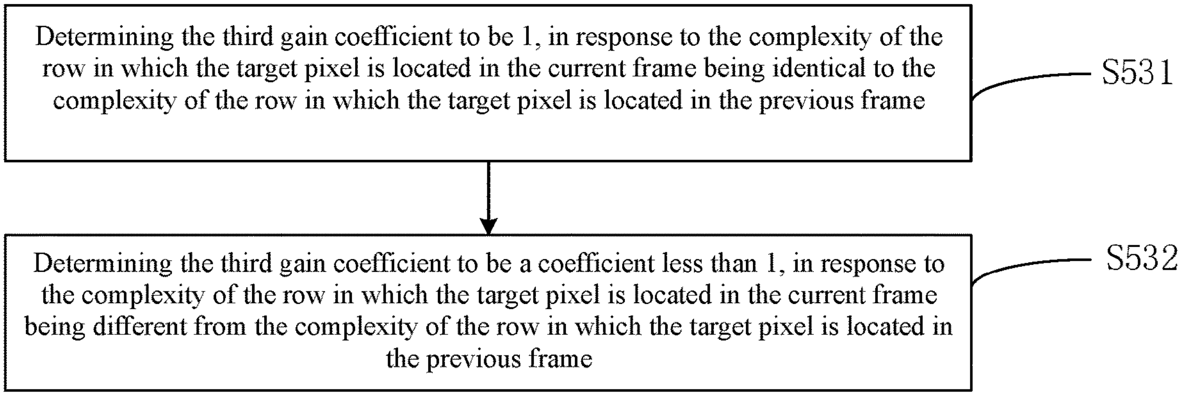
FIG. 15 is a schematic flow chart of step S53 in FIG. 14.
FIG. 16 is a schematic diagram of a mode of determining a third gain coefficient in an over-driving method provided by some embodiments of the present disclosure.

FIG. 15 is a schematic flow chart of step S53 in FIG. 14. As illustrated in FIG. 15, in some examples, step S53 may further include operations below.

Step S531: determining the third gain coefficient to be 1, in response to the complexity of the row in which the target pixel is located in the current frame being identical to the complexity of the row in which the target pixel is located in the previous frame;

Step S532: determining the third gain coefficient to be a coefficient less than 1, in response to the complexity of the row in which the target pixel is located in the current frame being different from the complexity of the row in which the target pixel is located in the previous frame.

For example, in step S531, if the complexity of the row in which the target pixel is located in the current frame is "complication" and the complexity thereof in the previous frame is also "complication", the third gain coefficient is determined to be 1; if the complexity of the row in which the target pixel is located in the current frame is "simplicity" and the complexity thereof in the previous frame is also "simplicity", the third gain coefficient is also determined to be 1. At this time, when multiplying the third gain coefficient by the initial compensation parameter, the third gain coefficient does not affect the original compensation value. That is, if the complexity of the row in which the target pixel is located in the current frame is identical to the complexity thereof in the previous frame, it indicates that the target pixel needs over-driving compensation, so over-driving compensation is supplied to the target pixel, so as to implement over-drive.

For example, in step S532, if the complexity of the row in which the target pixel is located in the current frame is "complication" but the complexity thereof in the previous frame is "simplicity", the third gain coefficient is determined to be a coefficient less than 1; if the complexity of the row in which the target pixel is located in the current frame is "simplicity" but the complexity thereof in the previous frame is "complication", the third gain coefficient is also determined to be a coefficient less than 1. At this time, when multiplying the third gain coefficient by the initial compensation parameter, the third gain coefficient makes the compensation value reduce, even to 0. That is, if the complexity of the row in which the target pixel is located in the current frame is different from the complexity thereof in the previous frame, it indicates that over-driving compensation to the target pixel may cause side effects, so the compensation value needs to be reduced. Therefore, the third gain coefficient is used for adjusting the compensation value, so as to achieve a purpose of not compensating or reducing a compensation level.

For example, in some examples, in response to the complexity of the row in which the target pixel is located in the current frame being complication but the complexity of the row in which the target pixel is located in the previous frame being simplicity, the third gain coefficient is determined to be K1, where $0 \le K1 < 1$; in response to the complexity of the row in which the target pixel is located in the current frame being simplicity but the complexity of the row in which the target pixel is located in the previous frame being complication, the third gain coefficient is determined to be K2, where $0 \le K2 < 1$. For example, K1 and K2 are not identical. That is, in different circumstances, the third gain coefficient may be different, so as to adjust the compensation value according to different circumstances.

For example, in some examples, the third gain coefficient may be determined in the mode illustrated in FIG. 16. As illustrated in FIG. 16, if complexity of a row of pixels in a previous frame is simplicity (illustrated as a simple line in the diagram), and complexity thereof in a current frame is also simplicity, then a third gain coefficient is G1; if complexity of a row of pixels in a previous frame is simplicity, and complexity thereof in a current frame is complication (illustrated as a complex line in the diagram), a third gain coefficient is G2; if complexity of a row of pixels in a previous frame is complication and complexity thereof in a current frame is simplicity, a third gain coefficient is G3; if complexity of a row of pixels in a previous frame is complication, and complexity thereof in a current frame is also complication, a third gain coefficient is G4. For example, in some examples, values of G1, G2, G3, and G4 are different from each other. For example, in other examples, G1 and G4 are both 1, while G2 and G3 are values less than 1. Therefore, targeted adjustment may be performed according to actual needs, so as to meet diversified needs. It should be noted that the mode for determining the third gain coefficient as described above is only exemplary, which does not constitute a limitation on the embodiments of the present disclosure.

By executing steps S40 and S50, the side effects of over-drive can be effectively prevented and avoided, so as to implement accurate correction, and improve display quality. Returning to FIG. 11, in the case where the over-driving method includes steps S40 and S50, step S30 may include: multiplying the initial compensation parameter, the first gain coefficient, the second gain coefficient, and the third gain coefficient, so as to obtain the target compensation parameter. That is, on the basis of the initial compensation parameter, the initial compensation parameter is adjusted and modified by the first gain coefficient, the second gain coefficient, and the third gain coefficient, and a result obtained thereby is taken as the target compensation parameter. For example, the target compensation parameter is an over-driving compensation value finally obtained, and a sum of the target compensation parameter and the value of the target pixel serves as the actual data voltage supplied to the target pixel, so as to implement over-driving compensation.

In the embodiment of the present disclosure, through the above-described respective steps, the over-driving method can implement over-drive of the display device to improve the response speed. The respective steps do not involve comparison of frame data, and thus require no frame memory, only a line memory is required, which has low requirements for hardware resources, and can reduce hardware costs. The over-driving method has performance similar to that of the over-driving method adopting a frame memory, and this over-driving method can avoid the side effects of over-drive and can effectively improve display quality.

Figure 17:
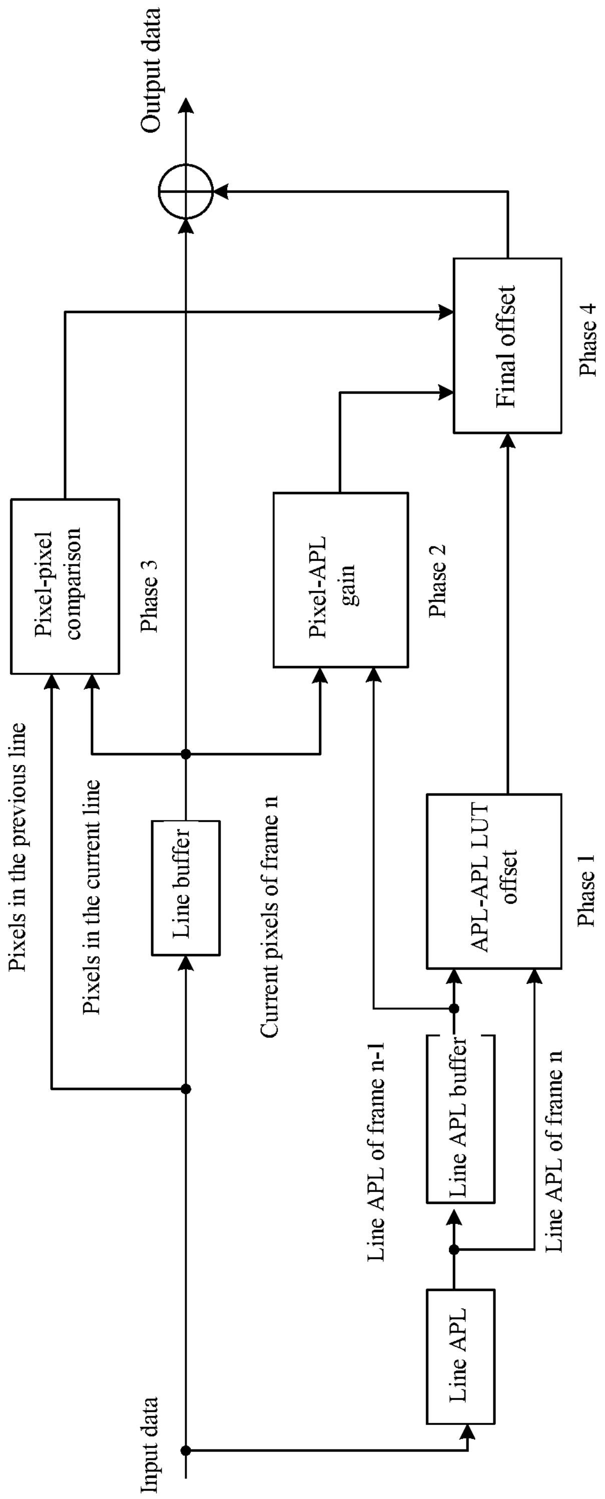
FIG. 17 is an operation flow chart of an over-driving method for a display device provided by some embodiments of the present disclosure.

FIG. 17 is an operation flow chart of an over-driving method used in a display device provided by some embodiments of the present disclosure. The operation flow of the over-driving method used in the display device provided by the embodiment of the present disclosure is briefly described below in conjunction with FIG. 17.

As illustrated in FIG. 17, firstly, the input data, that is, the value of the target pixel, is obtained and stored in a line buffer. Then, APL of the row in which the target pixel is located in the current frame, that is, a line APL of frame n illustrated in the diagram, is calculated. Next, a line APL of the previous frame, that is, a line APL of frame n−1, is read from a line APL buffer. According to the line APL of frame n and the line APL of frame n−1, an offset (i.e., the initial compensation parameter as described above) can be obtained by looking up the table (e.g., APL-APL LUT), as illustrated in phase 1 in the diagram.

Next, by comparing the value of the target pixel (i.e., the current pixel of frame n illustrated in the diagram) with the line APL of frame n−1, the first gain coefficient can be obtained, that is, phase 2 illustrated in the diagram. In addition, the pixels of the current row are compared with the pixels of the previous row, so as to determine the second gain coefficient, that is, phase 3 illustrated in the diagram.

Then, the third gain coefficient is determined according to the image complexity parameter, and the offset obtained in phase 1 is multiplied by the first gain coefficient, the second gain coefficient, and the third gain coefficient, so as to obtain a final offset (e.g., the target compensation parameter as described above), that is, phase 4 illustrated in the diagram.

Finally, the final offset is added to the value of the target pixel, so as to obtain the output data; and the output data is the actual data voltage to be supplied to the target pixel.

In the above-described mode, over-drive can be implemented, and the entire process can be implemented by using only two line memories without any frame memory; for example, the two line memories are the line APL buffer and the line buffer illustrated in FIG. 17, so that performance similar to that of the over-driving method adopting a frame memory can be obtained. This has low requirements for hardware resources, and may reduce hardware costs. Moreover, the over-driving method can avoid the side effect of over-drive and can effectively improve display quality.

It should be noted that the over-driving method provided by the embodiment of the present disclosure may further include more or fewer steps, and is not limited to the respective steps as described above. In addition, an execution order of the respective steps is not limited, which may be determined according to actual needs.

At least one embodiment of the present disclosure further provides an over-driving apparatus used in a display device. The over-driving apparatus can implement over-drive of the display device to improve the response speed without any frame memory, the requirements for hardware resources are low, and hardware costs can be reduced, which may avoid side effects of over-drive, and may effectively improve display quality.

Figure 18:
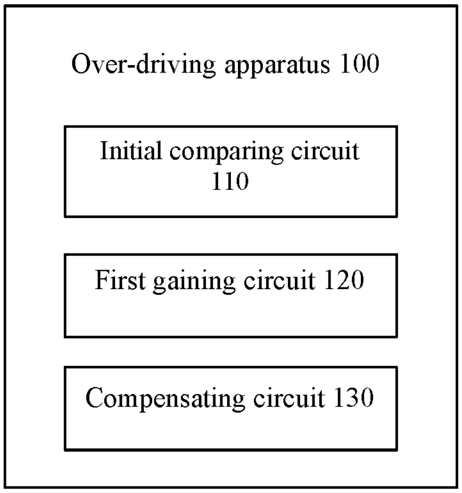
FIG. 18 is a schematic block diagram of an over-driving apparatus for a display device provided by some embodiments of the present disclosure.

FIG. 18 is a schematic block diagram of an over-driving apparatus used in a display device provided by some embodiments of the present disclosure. As illustrated in FIG. 18, in some embodiments, the over-driving apparatus 100 includes an initial comparing circuit 110, a first gaining circuit 120, and a compensating circuit 130. For example, the over-driving apparatus 100 is used in the display device and can implement over-drive. The display device includes a plurality of pixels; and the plurality of pixels are arranged in a plurality of rows and a plurality of columns as an array. The display device may be an OLED display device, an LCD display device, a QLED display device, or other type of display device, which is not limited in the embodiment of the present disclosure. The conventional design may be referred to for description of the display device, and no details will be repeated here.

For example, the initial comparing circuit 110 is configured to obtain an initial compensation parameter according to a first average brightness level and a second average brightness level of a row of pixels. For example, the first average brightness level is an average brightness level of the row of pixels in a current frame, and the second average brightness level is an average brightness level of the row of pixels in a previous frame. For example, the initial comparing circuit 110 may execute step S10 of the over-driving method illustrated in FIG. 3 and FIG. 11.

The first gaining circuit 120 is configured to obtain a first gain coefficient according to a value of a target pixel in the current frame and the second average brightness level corresponding to the row in which the target pixel is located. The target pixel is one pixel in the row of pixels. For example, the first gaining circuit 120 may execute step S20 of the over-driving method illustrated in FIG. 3 and FIG. 11.

The compensating circuit 130 is configured to obtain a target compensation parameter of the target pixel according to the initial compensation parameter and the first gain coefficient. For example, the compensating circuit 130 may execute step S30 of the over-driving method illustrated in FIG. 3 and FIG. 11.

For example, the over-driving apparatus 100 may further include other circuits, so as to implement steps S40 and S50 of the over-driving method illustrated in FIG. 3 and FIG. 11.

It should be noted that the initial comparing circuit 110, the first gaining circuit 120 and the compensating circuit 130 may be hardware, software, firmware, and any feasible combination thereof. For example, the initial comparing circuit 110, the first gaining circuit 120, and the compensating circuit 130 may be dedicated or general-purpose circuits, chips, or apparatuses, etc., or may also be a combination of a processor and a memory. Specific implementation forms of the initial comparing circuit 110, the first gaining circuit 120, and the compensating circuit 130 are not limited in the embodiments of the present disclosure.

It should be noted that in the embodiment of the present disclosure, the respective circuits of the over-driving apparatus 100 correspond to the respective steps of the foregoing over-driving method. The relevant description of the over-driving method above may be referred to for specific functions of the over-driving apparatus 100, and no details will be repeated here. Components and structures of the over-driving apparatus 100 illustrated in FIG. 18 are only exemplary, but not restrictive. As required, the over-driving apparatus 100 may further include other components and structures.

At least one embodiment of the present disclosure further provides a display device; and the display device includes the over-driving apparatus provided by any one embodiment of the present disclosure. The display device can implement over-drive to improve the response speed without any frame memory, has low requirements for hardware resources, and may reduce hardware costs, which can avoid side effects of over-drive, and can effectively improve display quality.

Figure 19:
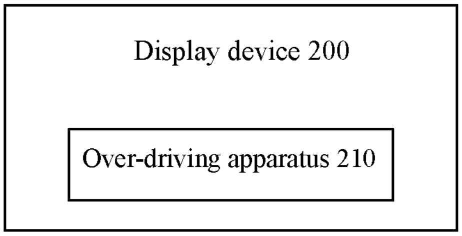
FIG. 19 is a schematic block diagram of a display device provided by some embodiments of the present disclosure.

FIG. 19 is a schematic block diagram of a display device provided by some embodiments of the present disclosure. As illustrated in FIG. 19, in some embodiments, the display device 200 includes an over-driving apparatus 210. The over-driving apparatus 210 is, for example, the over-driving apparatus 100 illustrated in FIG. 18. The display device 200 may be an OLED display device, an LCD display device, a QLED display device, or other type of display device, which is not limited in the embodiments of the present disclosure. The display device 200 has an over-drive function and can implement over-driving compensation for pixels. The description of the over-driving apparatus 100 above may be referred to for relevant description and technical effects of the display device 200, and no details will be repeated here.

At least one embodiment of the present disclosure further provides an electronic device; the electronic device includes a processor and a memory; one or more computer program modules are stored in the memory and configured to be executed by the processor; and the one or more computer program modules are configured to implement the over-driving method provided by any one embodiment of the present disclosure. The electronic device can implement over-drive of the display device to improve the response speed without any frame memory, has low requirements for hardware resources, and may reduce hardware costs, which may avoid side effects of over-drive, and effectively improve display quality.

Figure 20:
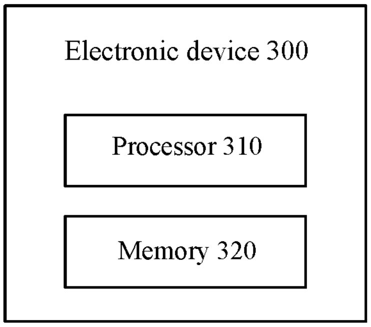
FIG. 20 is a schematic block diagram of an electronic device provided by some embodiments of the present disclosure.

FIG. 20 is a schematic block diagram of an electronic device provided by some embodiments of the present disclosure. As illustrated in FIG. 20, the electronic device 300 includes a processor 310 and a memory 320. The memory 320 is configured to store non-transitory computer readable instructions (e.g., one or more computer program modules). The processor 310 is configured to run the non-transitory computer readable instructions, and the non-transitory computer readable instructions may execute one or more steps in the above-described over-driving method when run by the processor 310. The memory 320 and the processor 310 may be interconnected by a bus system and/or other form of connection mechanisms (not illustrated).

For example, the processor 310 may be a central processing unit (CPU), a graphics processing unit (GPU), a digital signal processor (DSP), or other form of processing circuit having a data processing capability and/or a program execution capability, for example, a field programmable gate array (FPGA), etc. For example, the central processing unit (CPU) may be an X86 or ARM architecture. The processor 310 may be a general purpose processor or a special purpose processor, and may control other components in the electronic device 300 to execute desired functions.

For example, the memory 320 may include any combination of one or more computer program products, and the computer program products may include various forms of computer readable storage media, for example, a volatile memory and/or a non-volatile memory. The volatile memory may include, for example, a random access memory (RAM) and/or a cache, or the like. The non-volatile memory may include, for example, a read only memory (ROM), a hard disk, an erasable programmable read only memory (EPROM), a portable compact disk read only memory (CD-ROM), a USB memory, a flash memory, or the like. One or more computer program modules may be stored on the computer readable storage medium, and the processor 310 may run the one or more computer program modules, so as to implement various functions of the electronic device 300. Various applications and various data, as well as various data used and/or generated by the applications may also be stored in the computer readable storage medium.

It should be noted that, in the embodiment of the present disclosure, the above description of the over-driving method may be referred to for specific functions and technical effects of the electronic device 300, and no details will be repeated here.

Figure 21:
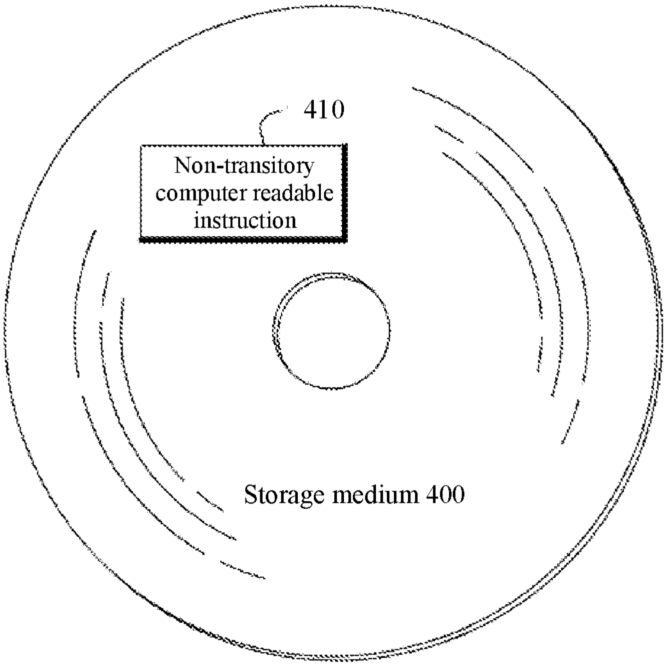
FIG. 21 is a schematic diagram of a storage medium provided by some embodiments of the present disclosure.

FIG. 21 is a schematic diagram of a storage medium provided by some embodiments of the present disclosure. As illustrated in FIG. 21, the storage medium 400 is configured to store non-transitory computer readable instructions 410. For example, the non-transitory computer readable instructions 410 may execute one or more steps in the above-described over-driving method when executed by a computer.

For example, the storage medium 400 may be applied to the above-described electronic device. For example, the storage medium 400 may be the memory 320 in the electronic device 300 illustrated in FIG. 20. For example, the corresponding description of the memory 320 in the electronic device 300 illustrated in FIG. 20 may be referred to for relevant description of the storage medium 400, and no details will be repeated here.

The following statements should be noted.

(1) The accompanying drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. An over-driving method for a display device, wherein the display device comprises a plurality of pixels, the plurality of pixels are arranged in a plurality of rows and a plurality of columns as an array, and the method comprises:

obtaining an initial compensation parameter according to a first average brightness level and a second average brightness level of a row of pixels, wherein the first average brightness level is an average brightness level of the row of pixels in a current frame, and the second average brightness level is an average brightness level of the row of pixels in a previous frame;

obtaining a first gain coefficient according to a value of a target pixel in the current frame and the second average brightness level corresponding to the row in which the target pixel is located, wherein the target pixel is one pixel in the row of pixels; and obtaining a target compensation parameter of the target pixel according to the initial compensation parameter and the first gain coefficient.

2. The method according to claim 1, wherein obtaining the first gain coefficient according to the value of the target pixel in the current frame and the second average brightness level corresponding to the row in which the target pixel is located comprises:

calculating an absolute value of a difference between the value of the target pixel in the current frame and the second average brightness level corresponding to the row in which the target pixel is located; and determining the first gain coefficient according to the absolute value of the difference.

3. The method according to claim 2, wherein determining the first gain coefficient according to the absolute value of the difference comprises:

taking the absolute value of the difference as an input of a preset function, and taking an output of the preset function as the first gain coefficient, wherein the input and the output of the preset function are positively correlated.

4. The method according to claim 3, wherein, in a case where the absolute value of the difference is 0, the first gain coefficient is 0; and a value range of the first gain coefficient is from 0 to 1.

5. The method according to claim 1, further comprising:

obtaining a second gain coefficient according to the value of the target pixel in the current frame and a value of an adjacent pixel in the current frame, wherein the adjacent pixel is a pixel located in a same column as the target pixel among pixels in a previous row of the row in which the target pixel is located.

6. The method according to claim 5, wherein obtaining the second gain coefficient according to the value of the target pixel in the current frame and the value of the adjacent pixel in the current frame comprises:

in response to an absolute value of a difference between the value of the target pixel in the current frame and the value of the adjacent pixel in the current frame being greater than a preset threshold, determining the second gain coefficient to be 0; and in response to the absolute value of the difference between the value of the target pixel in the current frame and the value of the adjacent pixel in the current frame being less than or equal to the preset threshold, determining the second gain coefficient to be 1.

7. The method according to claim 5, further comprising:

obtaining a third gain coefficient according to an image complexity parameter of the row in which the target pixel is located in the current frame and an image complexity parameter of the row in which the target pixel is located in the previous frame.

8. The method according to claim 7, wherein the image complexity parameter is obtained according to image edge information.

9. The method according to claim 8, wherein the image edge information comprises an absolute value of a difference between values of each two adjacent pixels among the pixels of the row in which the target pixel is located; and the image complexity parameter comprises a sum by adding up every absolute value of the difference between the values of each two adjacent pixels among the pixels of the row in which the target pixel is located.

10. The method according to claim 7, wherein obtaining the third gain coefficient according to the image complexity parameter of the row in which the target pixel is located in the current frame and the image complexity parameter of the row in which the target pixel is located in the previous frame comprises:

determining complexity of the row in which the target pixel is located in the current frame according to the image complexity parameter of the row in which the target pixel is located in the current frame;

determining complexity of the row in which the target pixel is located in the previous frame according to the image complexity parameter of the row in which the target pixel is located in the previous frame; and determining the third gain coefficient according to the complexity of the row in which the target pixel is located in the current frame and the complexity of the row in which the target pixel is located in the previous frame.

11. The method according to claim 10, wherein the complexity is divided into two categories of complication and simplicity;

in a case where the image complexity parameter is greater than a preset reference value, the complexity is complication; and in a case where the image complexity parameter is less than or equal to the preset reference value, the complexity is simplicity.

12. The method according to claim 11, wherein obtaining the third gain coefficient according to the complexity of the row in which the target pixel is located in the current frame and the complexity of the row in which the target pixel is located in the previous frame comprises:

determining the third gain coefficient to be 1, in response to the complexity of the row in which the target pixel is located in the current frame being identical to the complexity of the row in which the target pixel is located in the previous frame; and determining the third gain coefficient to be a coefficient less than 1, in response to the complexity of the row in which the target pixel is located in the current frame being different from the complexity of the row in which the target pixel is located in the previous frame.

13. The method according to claim 12, wherein determining the third gain coefficient to be the coefficient less than 1, in response to the complexity of the row in which the target pixel is located in the current frame being different from the complexity of the row in which the target pixel is located in the previous frame, comprises:

determining the third gain coefficient to be K1, in response to the complexity of the row in which the target pixel is located in the current frame being complication and the complexity of the row in which the target pixel is located in the previous frame being simplicity; and determining the third gain coefficient to be K2, in response to the complexity of the row in which the target pixel is located in the current frame being simplicity and the complexity of the row in which the target pixel is located in the previous frame being complication, where $0 \leq K1 < 1$, $0 \leq K2 < 1$, and K1 and K2 are not identical.

14. The method according to claim 7, wherein obtaining the target compensation parameter of the target pixel according to the initial compensation parameter and the first gain coefficient comprises:

multiplying the initial compensation parameter, the first gain coefficient, the second gain coefficient, and the third gain coefficient, so as to obtain the target compensation parameter.

15. The method according to claim 1, wherein obtaining the initial compensation parameter according to the first average brightness level and the second average brightness level of the row of pixels comprises:

performing lookup operation with a lookup table according to the first average brightness level and the second average brightness level, obtaining a table lookup result according to an interpolating method, and taking the table lookup result as the initial compensation parameter.

16. The method according to claim 1, wherein the average brightness level comprises an average of values of respective pixels in the row of pixels, a value of each pixel comprises a theoretical data voltage of each pixel, and the value of the target pixel comprises the theoretical data voltage of the target pixel;

a sum of the target compensation parameter and the value of the target pixel serves as an actual data voltage supplied to the target pixel; and the display device comprises an organic light emitting diode display device.

17. An electronic device, comprising:

a processor; and a memory, comprising one or more computer program modules, wherein the one or more computer program modules are stored in the memory and configured to be executed by the processor, and the one or more computer program modules are configured to implement the over-driving method for the display device according to claim 1.

18. A storage medium, storing non-transitory computer readable instructions, wherein the non-transitory computer readable instructions, when executed by a computer, implement the over-driving method for the display device according to claim 1.

19. An over-driving apparatus for a display device, wherein the display device comprises a plurality of pixels, the plurality of pixels are arranged in a plurality of rows and a plurality of columns as an array, and the over-driving apparatus comprises:

an initial comparing circuit, configured to obtain an initial compensation parameter according to a first average brightness level and a second average brightness level of a row of pixels, wherein the first average brightness level is an average brightness level of the row of pixels in a current frame, and the second average brightness level is an average brightness level of the row of pixels in a previous frame;

a first gaining circuit, configured to obtain a first gain coefficient according to a value of a target pixel in the current frame and the second average brightness level corresponding to the row in which the target pixel is located, wherein the target pixel is one pixel in the row of pixels; and a compensating circuit, configured to obtain a target compensation parameter of the target pixel according to the initial compensation parameter and the first gain coefficient.

20. A display device, comprising the over-driving apparatus according to claim 19.

* * * * *